United States Patent [19]
Koblo

[11] 3,822,865
[45] July 9, 1974

[54] APPARATUS FOR MOVING SUBSTANCES

[75] Inventor: Jochen Koblo, Wiesbaden, Germany

[73] Assignee: Kalle Aktiengesellschaft

[22] Filed: Dec. 5, 1972

[21] Appl. No.: 312,270

[30] Foreign Application Priority Data
Dec. 8, 1971 Germany.............................. 2160815

[52] U.S. Cl........................... 259/72, 74/56, 74/835
[51] Int. Cl............................................. B01f 11/00
[58] Field of Search.............. 259/72, 2, 12, 18, 29, 259/35, 54, 59, 91, 92, 93, 94; 141/74, 78, 77; 74/835, 836, 838, 841, 54, 55, 56

[56] References Cited
UNITED STATES PATENTS
2,494,866    1/1950    Fressola............................ 259/72 X
3,478,666    11/1969   Bishop.............................. 259/72 X FOREIGN PATENTS OR APPLICATIONS
906,611    3/1954    Germany.............................. 259/72

Primary Examiner—Billy J. Wilhite
Assistant Examiner—Alan I. Cantor
Attorney, Agent, or Firm—James E. Bryan, Esquire

[57]    ABSTRACT

This invention relates to an apparatus comprising a housing, a table pivotally secured at one end thereof to said housing, a rotatable eccentrically mounted disc pivotally secured to said housing, bearing means surrounding said disc and supporting the free end of said table, means for pivoting said disc and means for rotating said disc.

8 Claims, 5 Drawing Figures

PATENTED JUL 9 1974     3,822,865

APPARATUS FOR MOVING SUBSTANCES

The invention relates to apparatus for moving or mixing substances such as solid and/or liquid materials with an adjustable amplitude of movement.

Previously proposed machines for moving or mixing solid and/or liquid materials with an adjustable amplitude comprise eccentrically arranged rods which are firmly interconnected. When it is required to alter the amplitude of movement, the rods have to be moved towards or away from each other. However, this can be done only when the machine is stopped, and it necessitates a relatively complicated operation that cannot always by readily carried out by the machine operators. Moreover, the table is solidly connected to the eccentric system. Furthermore, on account of the construction of the abovementioned eccentric arrangement comprising quite a large number of bearing parts, continuous wear takes place and if the bearings become misaligned, this wear can lead to undesirable sudden thrusts during the course of the movement.

The present invention provides an apparatus for moving or mixing substances, which apparatus enables the amplitude of movement to be adjusted in use.

In accordance with the present invention, there is provided mixing apparatus comprising a table, an eccentrically mounted rotatable disc, the circumference of the disc being supported in a bearing, the outer circumferential wall of the bearing supporting the table, and the eccentric disc and bearing assembly being infinitely displaceable about a pivot point.

Preferably the bearing is a rolling-surface bearing, for example a ball-bearing.

The use of a ball-bearing unit as the ring in which the eccentric disc runs results in the avoidance of the adverse effect of wear on the disc and the table. Furthermore, this arrangement enables the amplitude to be changed during movement. The table may be fixed or, preferably, may be designed to be latched onto the housing of the apparatus and readily removed therefrom; in the latter case it may take the form of a tray or a container, for example, and may be used as a separate piece of equipment. The present invention accordingly also provides the above-defined apparatus, the table being omitted.

Displacement about the pivot point can be carried out when the machine is stopped or during the course of movement; displacement is provided for through an angle which extends from the vertical to the plane of the eccentric disc. This angle can be set at any position within the range of 0° to 90°, values between approximately 0° to 70° being preferred.

The apparatus of the invention is used, for example, for moving or mixing substances such as solid and/or liquid materials, for breaking up solid materials, for developing purposes in photographic reproduction installations or for etching printing plates.

The invention will now be described in more detail by reference to the accompanying drawings in which.

Figure 1:
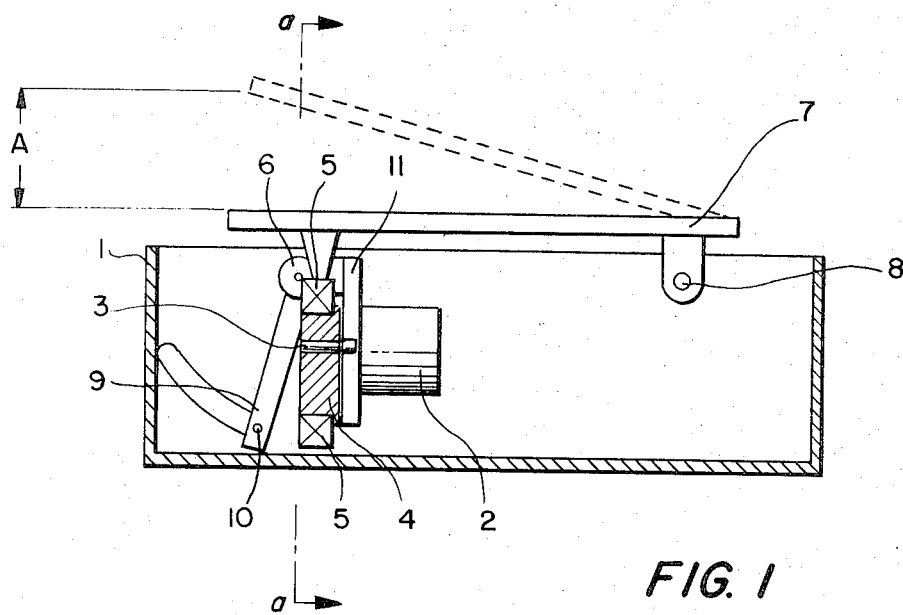
FIG. 1 is a cross-section through one embodiment of the apparatus of the invention.
Figure 2:
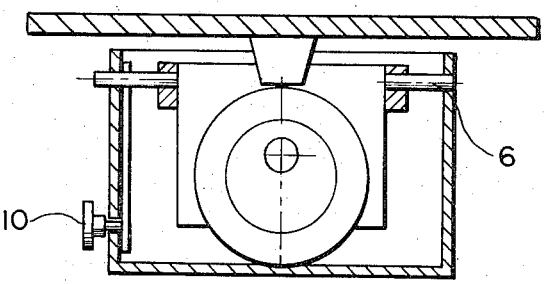
FIG. 2 shows a front view taken on line $a—a$ of FIG. 1.

The apparatus comprises a housing 1 (FIGS. 1 and 2), in which a geared motor 2 is connected by flanges to a plate 11. The plate 11 is adapted to be pivoted about the pivot 6 by means of a governing lever 9 and is securable in the required working position by means of a locking screw 10, which can be moved in a slot in the housing 1, this slot taking the form of an arc of a circle, the center of which is on the axis of pivot 6. Mounted on a shaft 3 of the motor is an eccentric disc 4 which is arranged to run in a ring constituted by a ball-bearing unit 5. A table 7 can be pivoted about a shaft 8 at one end; at its other end it is supported by the outer ring of the ball-bearing unit 5. The outer ring of the ball-bearing unit 5 is held stationary by the weight of the table 7; this prevents wear on both the eccentric disc 4 and the table 7.

When the motor is switched on, the eccentric disc 4 rotates and imparts a vertical oscillating movement to the table 7. The amplitude A of this movement can be varied by swinging the geared motor 2 together with the disc 4 about the pivot 6 by the governing lever 9; the position can be fixed by tightening the screw 10.

Figures 3, 4, 5:
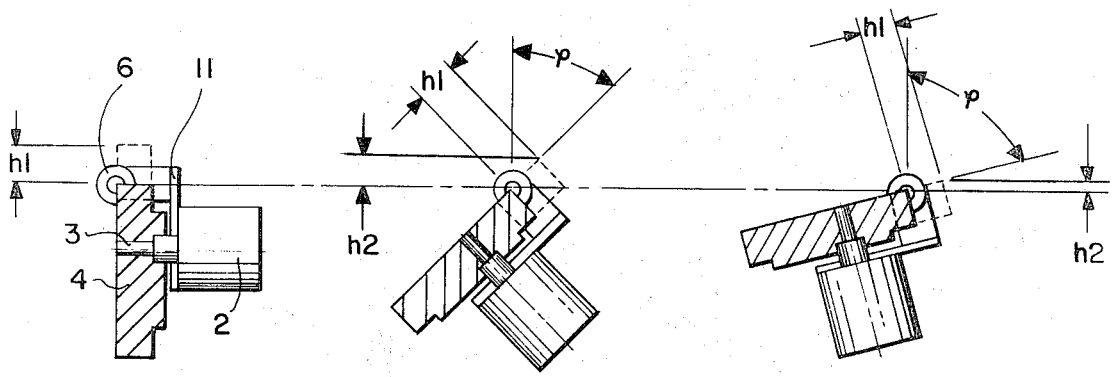
FIGS. 3 to 5 illustrate the assembly in different positions about the pivot point 6.

The maximum amplitude of movement $h_1$ (see FIGS. 3 to 5) is achieved when the table 7 and the eccentric disc 4 are at right-angles to each other, as shown in FIG. 3. If the eccentric disc 4 is moved from the vertical through the angle $\phi$, the table is lifted only through an angle of $h_2 = h_1 \times \cos \phi$ (FIGS. 3 to 5). Adjustment of the angle therefore results in a varying extent of movement on the part of the table 7.

The table 7 is adjustable in a continuous manner and the adjustment can, if desired, be carried out while the apparatus is operating.

Depending on the position of the shaft 8 and/or of the shaft 3 of the eccentric disc 4, it is also possible (though not shown in the drawings) to alter the vertical oscillating movement of the table 7 and, for example, to cause it to be executed symmetrically with respect to the horizontal. It is also possible to replace the shaft 8 by another similar arrangement comprising a geared motor 2, eccentric disc 4, and the cooperating components.

Also, the frequency of oscillation of the table 7 can be continuously varied with the aid of a variable-speed motor. Furthermore, the distance between the shaft 8 of the table 7 and the pivot point 6 can be variable depending upon whether it is required to use a finely adjustable oscillation having a small amplitude of movement, or an oscillation with a coarse adjustment and having a large amplitude of movement.

The table may take the form of a non-removable plate or a container such as a tray which can be fitted with receptacles.

The apparatus of the invention, while of extremely simple construction, can be used in a large number of ways. By appropriate choice of the operating conditions it can be used, for example, for keeping a liquid barely in motion, but it also can be employed for vigorously mixing solid finely-divided materials.

It will be obvious to those skilled in the art that many modifications may be made within the scope of the present invention without departing from the spirit thereof, and the invention includes all such modifications.

What is claimed is:

1. An apparatus comprising a housing, a table pivotally secured at one end thereof to said housing, a rotatable eccentrically mounted disc pivotally secured to said housing, bearing means surrounding said disc and supporting the free end of said table, means for pivoting said disc, and means for rotating said disc.

2. An apparatus as claimed in claim 1, wherein the bearing is a rolling-surface bearing.

3. An apparatus as claimed in claim 2 wherein the bearing is a ball-bearing.

4. An apparatus as claimed in claim 1 wherein the disc is pivotal at an angle up to 90° from the vertical plane.

5. An apparatus as claimed in claim 4 wherein the disc is pivotal at an angle up to 70° from the vertical plane.

6. An apparatus according to claim 1 in which the means for rotating the disc is a geared motor.

7. An apparatus according to claim 6 in which the motor is a variable speed motor.

8. An apparatus according to claim 1 in which the table is in the form of a container.

* * * * *